United States Patent [19]

Endo

[11] Patent Number: 5,349,665
[45] Date of Patent: Sep. 20, 1994

[54] COMPILER VECTORIZING SYSTEM

[75] Inventor: Akiyoshi Endo, Tokyo, Japan

[73] Assignee: NEC Corporation, Tokyo, Japan

[21] Appl. No.: 2,755

[22] Filed: Jan. 13, 1993

[30] Foreign Application Priority Data

Jan. 16, 1992 [JP] Japan .................................. 4-024311

[51] Int. Cl.$^5$ .............................................. G06F 9/45
[52] U.S. Cl. .............................. 395/700; 364/DIG. 1;
364/280.4; 364/232.21; 364/262
[58] Field of Search .................. 395/700; 364/DIG. 1,
364/280.4, 232.21, 262

[56] References Cited

U.S. PATENT DOCUMENTS 4,773,007 9/1988 Kanada et al. ....................... 364/300
4,807,126 2/1989 Gotou et al. ......................... 364/300
4,821,181 4/1989 Iwasawa et al. ..................... 364/200

Primary Examiner—Gareth D. Shaw
Assistant Examiner—A. Katbab

Attorney, Agent, or Firm—Foley & Lardner

[57] ABSTRACT

According to the present invention, there is provided a compiler vectorizing system for vectorizing the same variables defined at a plurality of positions by using an asymptotic formula in which a condition data generating formula generates condition data reflecting whether each condition is met. After a work array is generated corresponding to the variable, a linear asymptotic formula having a linear coefficient computed from the condition data and a constant term computed from the condition data is generated. A formula assigned to the variable by an asymptotic formula generating portion is used to substitute the entire definition of the variable within the loop with the asymptotic formula and to substitute the reference of the variable by the element of the work array set with a subscript at a variable substituting portion. As a result, a loop which cannot be vectorized according to the conventional technique can be vectorized.

3 Claims, 4 Drawing Sheets

FIG.2

```
DO 10  I=1,N
   IF(A(I).NE.0) THEN
   X=P(I)
   END IF
   IF(B(I).NE.0) THEN
   X=Q(I)
   END IF
   R(I)=X
10 CONTINUE
```

FIG.3

```
do i=1,n
if(a(i)≠0)then
x=p(i)
end if
if(b(i)≠0)then
x=q(i)
end if
r(i)=x
end do
```

FIG. 4

```
xx(1)=x                    ~20
do i=1,n
if(a(i)≠0)then
s(i)=1                     ~16
end if
if(b(i)≠0)then
t(i)=1                     ~17
end if
xx(i+1)=(1-t(i))x((1-s(i)xxx(i)+s(i)xp(i))
       +t(i)xq(i) ~18
r(i)=xx(i+1)               ~19
end do
x=xx(n+1)                  ~21
```

FIG. 5

```
v1=n
m1=(a≠0)
s=1 when m1
m2=(b≠0)
t=1 when m2
c=(1-t)x(1-s)
d=(1-t)xsxp+txq
igen(xx,c,d,x)
                           ~22
r=xx(+1)
x=xx(n+1)
```

FIG. 6

```
     DO 10 I=1,N
        Q(I)=X
        IF(A(I).NE.0) THEN
           X=P(I)
        END IF
10   CONTINUE
```

FIG. 7

```
do i=1,n
if(a(i)≠0)then
s(i)=1
end if
xx(i+1)=(1-s(i))*xx(i)+s(i)*p(i)
q(i)=xx(i)
end do
```

FIG. 8

```
      DO 10 I=1,N
        IF(A(I).NE.0)THEN
          X=P(I)
        END IF
        R(I)=X
        IF(B(I).NE.0) THEN
          X=Q(I)
        END IF
10    CONTINUE
```

FIG. 9

```
do i=1,n
if(a(i)≠0)then
s(i)=1
end if
if(b(i)≠0)then
t(i)=1
end if
c(i)=1-s(i)
d(i)=s(i)*p(i)
xx(i+1)=(1-t(i))*xx(i)+d(i))+t(i)*q(i)
r(i)=c(i)*xx(i)+d(i)
end do
```

COMPILER VECTORIZING SYSTEM

BACKGROUND OF THE INVENTION

The present invention relates to a compiler vectorizing system for generating a vectorized object program from a source program described in a high level language in a computer system which allows the vectoring operation to be achieved (hereinafter referred to as a vector computer).

In a vector computer, vectoring operation allows an extremely high speed execution as compared with the scalar operation. In order to fully utilize the capability of the vector computer as much as possible, in a compiler for the vector computer, it is important to increase the ratio (vectoring factor) of a portion of the object program which is executed by the vector operation. To this end, there exists a compiler vectorizing system.

Conventionally, in this type of the compiler vectoring system, if a variable defined or referenced within a loop is positively defined within a single iterative process, it can be arrayed for vectorization while if there exists a conditional branch within the loop and whether the variable is defined or not depends on whether the condition for each iterative process is met or not, then the loop cannot be vectorized. As a result, the vectorizing factor of the object program for the vector computer is lowered.

SUMMARY OF THE INVENTION

Accordingly, an object of the present invention is to eliminate such a drawback and to provide a compiler vectoring system which eliminates the fact that there exists the conditional branch within the loop and that whether the variable is defined or not depends on whether the condition for each iterative process is met or not (that is, the fact that a certain variable is defined under a single or a plurality of independent conditions, hereinafter referred to as the variable definition condition dependency) from the factors making the vectorization impossible so that the vectorizing factor of the object program for the vector computer may be increased while the time for executing the object program may be shortened.

According to the present invention, in a compiler for generating an object program vectorized from a source program described in a high level language for the vector computer, there is provided a compiler vectorizing system comprising;

- a dependency analyzing portion for detecting the fact that within a loop of an intermediate text program a specific variable is defined under a single or plurality of each dependent conditions, that is, the variable definition condition dependency;
- a condition data generating portion for generating the condition data reflecting whether each condition associated with the variable definition condition dependency detected by this dependency analyzing portion is met or not;
- a work array generating portion for generating a work array corresponding to the variable associated with the variable definition condition dependency which is detected by the dependency analyzing portion;
- an asymptotic formula generating portion for generating a linear asymptotic formula having a linear coefficient computed by the condition data generated by the condition data generating portion, a constant term computed by combining a formula representing a value assigned to each assignment statement associated with the variable definition condition dependency and the condition data and a work array generating portion;
- a variable substituting portion for substituting the reference of the variable associated with the variable definition condition dependency within the loop associated with the variable definition condition dependency by the reference of an element of the work array which is generated by the work array generating portion; an initial value assigning-/generating portion for generating an intermediate text in which the value of the variable associated with the variable definition condition dependency immediately before the loop associated with the variable definition condition dependency is executed is assigned into the header element of the work array generated by the work array generating portion to insert the intermediate text immediately before the loop;
- a terminal value assuring/generating portion for generating an intermediate text in which the value of an element defined at the last of the work array generated by the work array generating portion is assigned to the variable associated with the variable definition condition dependency to insert the intermediate text immediately after the loop associated with the variable definition condition dependency; and
- a text generating portion for vectorizing the intermediate text to generate the vector intermediate text.

In a preferable embodiment of the present invention, the subscript of the work array is offset forwards, if the variable defined under a single or a plurality of independent conditions within the loop is referenced upwardly of the definition of all the variables in that loop, when the variable is substituted into the work array in which it is referenced.

Alternatively, a code is generated to compute the value retained at the referencing point by that variable, if the variable defined under a single or a plurality of conditions is referenced within the loop between the uppermost and the lowermost definitions of that loop.

That is, since the compiler vectorizing system of the present invention is provided with the dependency analyzing portion, condition data generating portion, work array generating portion, asymptotic formula generating portion, variable substituting portion, initial value assigning/generating portion, terminal value assuring/generating portion and the vector text generating portion, it becomes possible to vectorize the loop which could not be vectorized according to the vectorizing process by the conventional compiler, and to increase the vectorizing factor of the object program for the vector computer while shortening the execution time of the object program.

The present invention will be clearly understood from the following description with reference to the accompanying drawings.

BRIEF DESCRIPTION OF THE DRAWINGS

FIG. 2 shows a specific embodiment of the loop present within a source program of FIG. 1;

FIG. 3 shows an intermediate text generated by a parsing portion of FIG. 1 based on the loop of FIG. 2;

FIG. 4 shows a vectorizable intermediate text which is generated by controlling the vectorizing portion of FIG. 1 based on the intermediate text of FIG. 3;

FIG. 5 shows a vector intermediate text generated by controlling the vectorizing portion of FIG. 1 based on the intermediate text of FIG. 4;

FIG. 6 shows a specific example present within the source program of FIG. 2, which differs from FIG. 1;

FIG. 7 shows the intermediate text when the processing of the parsing portion of FIG. 1, dependency analyzing portion, condition data generating portion, work array generating portion, asymptotic formula generating portion, and the variable substituting portion is completed, under the control of the vectorizing portion, based on the loop of FIG. 6;

FIG. 8 shows a specific example of the loop present within the source program of FIG. 1, which differs from FIG. 2 as well as FIG. 6; and FIG. 9 shows the intermediate text when the process of the parsing portion of FIG. 1, dependency analyzing portion, condition data generating portion, work array generating portion, asymptotic formula generating potion and the variable substituting portion is completed, under the control of the vectorizing portion, based on the loop of FIG. 8.

DETAILED DESCRIPTION OF THE PREFERRED EMBODIMENTS

Figure 1:
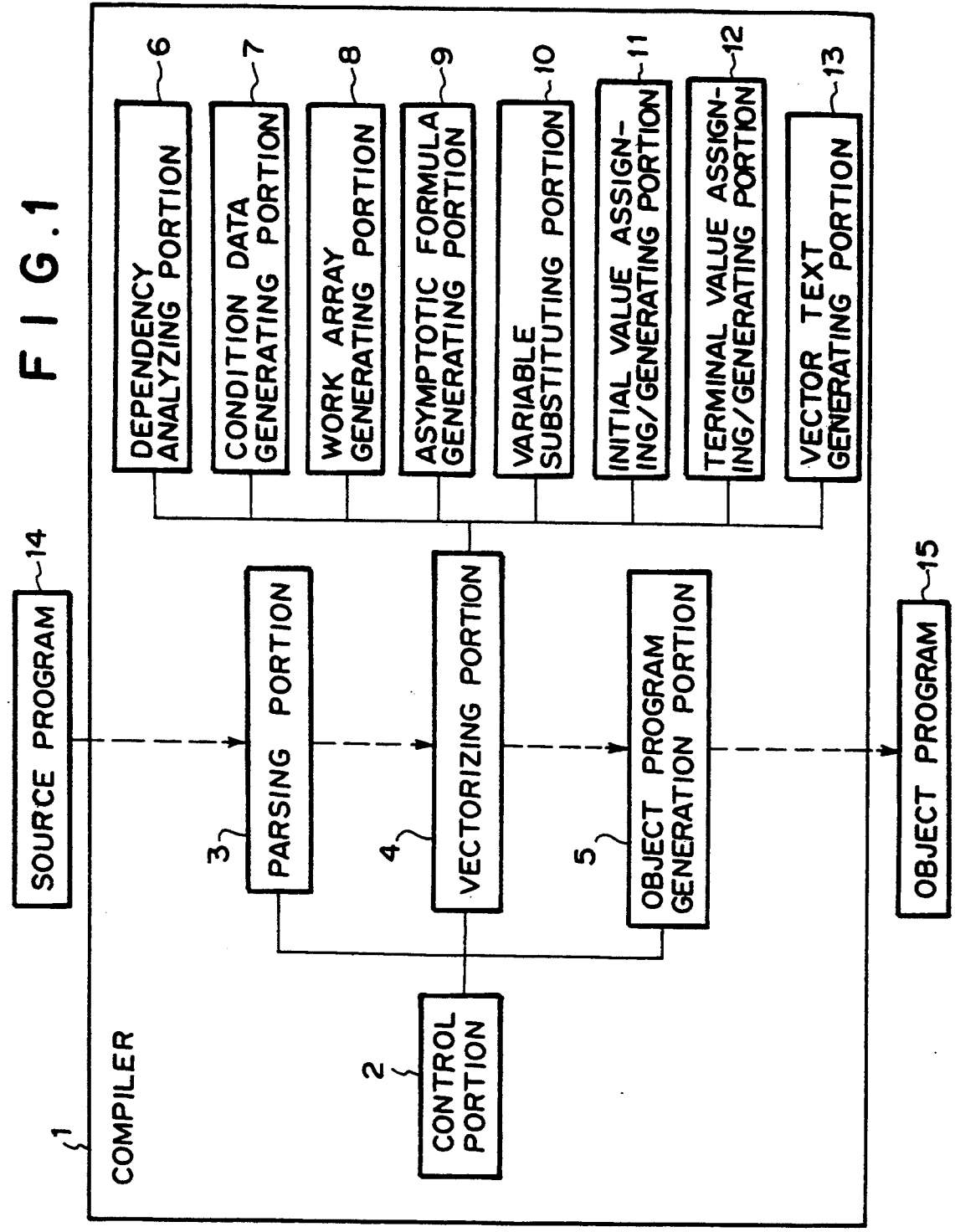
FIG. 1 is a block diagram of the arrangement of a specific embodiment of the present invention.

FIG. 1 is a block diagram illustrating a specific embodiment of the compiler vectorizing system according to the present invention. The compiler vectorizing system according to this embodiment comprises a compiler 1, a source program 14 and an object program 15.

The compiler 1 comprises a control portion 2, a parsing portion 3, a vectorizing portion 4, an object program generation condition portion 5, a dependency analyzing portion 6, a condition data generating portion 7, a work array generating portion 8, an asymptotic formula generating portion 9, a variable substituting portion 10, an initial value assigning/generating portion 11, a terminal value assigning/generating portion 12 and a vector text generating portion 13.

FIG. 2 illustrates a specific example of the loop present within the source program 14. Incidentally, I and N within FIG. 2 each denote an integer variable.

FIG. 3 shows the intermediate generates text by the parsing portion 3 based on the loop within the source program 14 of FIG. 3. Incidentally, (i) and (n) within FIG. 3 each denote an integer variable (the same is the also the case with FIGS. 4 and 5).

FIG. 4 shows a vectorizable intermediate text which is generated under the control of the vectorizing portion 4 based on the intermediate text of FIG. 3.

FIG. 5 shows a vector intermediate text (vectorized intermediate text) generated under the control of the vectorizing portion 4 based on the intermediate text of FIG. 4.

FIG. 6 shows a loop present within the source program 14 which differs from that of FIG. 2. Incidentally, I and N within FIG. 6 each denote an integer variable.

FIG. 7 shows the intermediate text when the processing of the parsing portion 3, dependency analyzing portion 6, condition data generating portion 7, work array generating portion 8, asymptotic formula generating portion 9 and variable substituting portion 10 is completed, under the control of the vectorizing portion 4, based on the loop within the source program 14 of FIG. 6. Incidentally, (i) and (n) within FIG. 7 each denote an integer variable.

FIG. 8 shows a specific example present within the source program 14 which differs from FIG. 2 as well as FIG. 6. Incidentally, I and N within FIG. 8 each denote an integer variable.

FIG. 9 shows the intermediate text when the process of the parsing portion 3, dependency analyzing portion 6, condition data generating portion 7, work array generating portion 8, asymptotic formula generating portion 9 and variable substituting portion 10 is completed, under the control of the vectorizing portion 4, based on the loop within the source program 14 of FIG. 8. Incidentally, (i) and (n) within FIG. 9 each denote an integer variable.

Next, the operation of the compiler vectorizing system arranged as above is hereinafter described. Incidentally, let us assume that each loop of FIGS. 2, 6 and 8 is present within the source program.

The control portion 2 within the compiler 1 carries out an overall control over a series of processes in the following compiler 1 (no special reference is made to the control portion 2 in the following description).

First, the parsing portion 3 parses the source program 14 in which the loop of FIG. 2 is present to generate an intermediate text program including the intermediate text (loop) of FIG. 3.

The vectorizing portion 4 whose control is transferred from the parsing portion 3 detects the loop within the intermediate text program which is generated by the parsing portion 3 to sequentially vectorize each detected loop.

The vectorizing portion 4, when it vectorizes the loop, first invokes the dependency analyzing portion 6.

The dependency analyzing portion 6 analyzes how the variable and the array within the loop are defined or referenced to examine whether the loop can be vectorized or not. In that analysis, it is determined whether the variable definition condition dependency is present within the loop or not. Since, in the loop, there are the variable definition condition dependencies in which the variable (x) is defined under two independent conditions:

$a(i) \neq 0$ and $b(i) \neq 0,$ the dependency analyzing portion 6 detects that variable definition condition dependency. Since the variable definition condition dependency is detected by the dependency analyzing portion 6, the vectorizing portion 4 sequentially invokes the condition data generating portion 7, work array generating portion 8, asymptotic formula generating portion 9, variable substituting portion 10, initial value assigning/generating portion 11 and terminal value assuring/generating portion 12 to transform that loop into the intermediate text of FIG. 4 which can be vectorized. In that process, each portion carries out the following process.

The condition data generating portion 7 generates the intermediate texts 16 and 17 each giving the condition data s(i) which becomes 1 when the condition $a(i) \neq 0$ and becomes 0 if not and the condition data t(i) which becomes 1 if $b(i) \neq 0$ and becomes 0 if not. Incidentally, in this embodiment, it is assumed that, in the processing by the condition data generating portion 7, all the elements of the arrays s and t retaining the condition data be initialized prior to the execution of the object program 15.

The work array generating portion 8 generates a work array xx corresponding to the variable (x).

The asymptotic generating portion 9 generates the intermediate text 18 illustrating a linear asymptotic formula:

$$xx(i+1)=(1-t(i))*((1-s(i))*xx(i) +s(i)*p(i))+t(i)*q(i)$$

which gives the value to be retained in each iteration of the loop by the variable to each element of the work array xx by using the values p(i) and q(i) to be assigned each definition of the condition data s(i), t(i) and the variable (x) to substitute the entire definition of the variable (x) within the loop by its intermediate text 18.

The variable substituting portion 10 substitutes the intermediate text referencing the variable (x) within the loop by the intermediate text 19 referencing the element of the work array xx.

The initial value assigning/generating portion 11 generates the intermediate text 20 which assigns the value of the variable (x) immediately before the loop is executed into the header element xx(1) of the work array xx to insert that intermediate text 20 immediately before the loop.

The terminal value assigning/generating portion 12 generates an intermediate text 21 (for assuring the terminal value) which assigns the value of the element xx(n+1) defined at the last of the work array xx into the variable (x) to insert that intermediate 21 immediately after the loop.

After the intermediate text is transformed as described above (the intermediate text of FIG. 3 is transformed into that of FIG. 4), the vectorizing portion 4 invokes the vector text generating portion 13.

The vector text generating portion 13 carries out vectorization on the intermediate text of FIG. 4 to generate the vector intermediate text of FIG. 5. In the vector intermediate text of FIG. 5, the intermediate text 18 showing the linear asymptotic formula within FIG. 4 is substituted by the vector intermediate text 22 showing the vector asymptotic formula instruction.

The vectorizing portion 4 carries out vectorization within the intermediate text program which includes vectorization of the loop of FIG. 3 as far as possible to pass the control to the object program generation portion 5.

The object program generation portion 5 generates the vectorized object program 15 from the vector intermediate text program including the vector intermediate text of FIG. 5.

Next, a case in which the loop of FIG. 6 is present within the source program 14 is described. The feature of the loop of FIG. 6 lies in the fact that the variable X is referenced upwardly of all the definitions of the variable X within the loop, In this case, it must be reflected that the value of X, when being referenced, equals the final value in the iteration one before. Therefore, in the processing of the variable substituting portion 10, when the reference to the variable (x) is substituted by the reference to the work array xx, its subscript is offset one from the element defined by the iteration. FIG. 7 illustrates the intermediate text when the processing of the variable substituting portion 10 is completed.

Finally, a processing according to the present invention when the loop of FIG. 8 is present within the source program 14 is described. The feature of the loop of FIG. 8 lies in the fact that the reference to the variable X is conducted between a plurality of definitions of the variable X within the loop. In this case, the variable substituting portion 10, when the reference to the variable (x) is substituted by the reference to the work array xx, substitutes it by such a formula in which the intermediate value is properly computed. FIG. 9 illustrates an intermediate text when the processing is completed up to the variable substituting portion 10.

What is claimed is:

1. A method within a vector computer compiler of generating a vectorized object program from a source program described in a high level language, the method comprising the steps of:

detecting a variable definition condition dependency when a specific variable is defined under a plurality of independent conditions within a loop within an intermediate text;

generating condition data reflecting whether each independent condition associated with the variable definition condition dependency is met;

generating a work array corresponding to a variable associated with the variable definition condition dependency;

generating a linear asymptotic formula having
      a linear coefficient computed from the condition data, and
      a constant term computed by combining the condition data with values assigned to each condition of the condition data;

installing in the work array a calculation of the linear coefficient and the constant term;

substituting a reference of the variable associated with the variable definition condition dependency within the loop for a corresponding element of the work array;

generating a first intermediate text element and inserting it immediately before the loop;

generating a second intermediate text element, in which the value of a last defined element of the work array is assigned a value associated with the variable definition condition dependency, and inserting the second intermediate text element immediately after the loop associated with the variable definition condition dependency such that the intermediate text comprises the text inclusively located between the first intermediate text element and the second intermediate text element; and vectorizing the intermediate text to generate a vectorized intermediate text.

2. The method according to claim 1, wherein a subscript of the work array is offset forward at the time when the reference of the variable is substituted into the work array if the variable defined under the plurality of independent conditions is referenced upwardly.

3. The method according to claim 1, wherein a code is generated for computing the value retained by the variable when the variable defined under the plurality of independent conditions is referenced between an uppermost and a lowermost definition of the variable.

* * * * *